Figure 1:
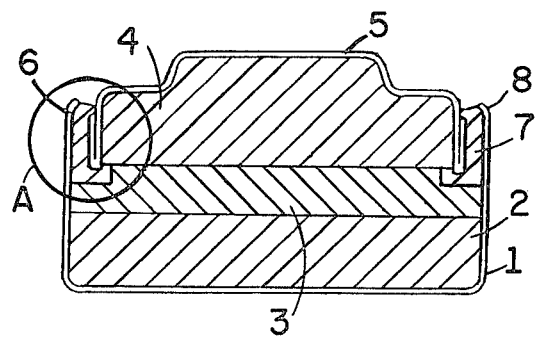

United States Patent [19]

Ishida et al.

[11] 4,220,695
[45] Sep. 2, 1980

[54] LEAK-PROOF ALKALINE CELL AND ITS MANUFACTURE

[75] Inventors: Osamu Ishida, Suita; Yoshio Uetani, Ibaraki; Seiichi Matsushima, Toyonaka, all of Japan

[73] Assignee: Hitachi Maxell, Ltd., Osaka, Japan

[21] Appl. No.: 48,225

[22] Filed: Jun. 13, 1979

[30] Foreign Application Priority Data

| Jun. 13, 1978 | [JP] | Japan | 53-71885 |
| Jun. 13, 1978 | [JP] | Japan | 53-71886 |
| Jun. 13, 1978 | [JP] | Japan | 53-71887 |
| Jun. 13, 1978 | [JP] | Japan | 53-71889 |
| Jun. 13, 1978 | [JP] | Japan | 53-71890 |

[51] Int. Cl.² .................................... H01M 2/08
[52] U.S. Cl. .................................... 429/172; 429/185; 429/206

[58] Field of Search .................... 429/171–174, 429/181, 184, 185, 206

[56] References Cited

U.S. PATENT DOCUMENTS

| 3,440,110 | 4/1969 | Arbter | 429/174 X |
| 4,020,241 | 4/1977 | Heinz, Jr. | 429/172 X |
| 4,068,049 | 1/1978 | Narushi | 429/206 |

Primary Examiner—Charles F. LeFevour
Attorney, Agent, or Firm—Birch, Stewart, Kolasch & Birch

[57] ABSTRACT

A leak-proof alkaline cell comprising a positive can and a negative electrode collector kept at the opening end of the positive can with intervention of a gasket so as to make the inside of the cell liquid-tight, characterized in that the gasket is made of an alkali resistant, elastic material and has a moisture content of not more than 0.3% by weight.

7 Claims, 2 Drawing Figures

LEAK-PROOF ALKALINE CELL AND ITS MANUFACTURE

The present invention relates to a leak-proof alkaline cell and its manufacture.

An alkaline cell is usually manufactured by admitting a positive depolarizing mix with a small amount of an electrolyte to a positive can, placing a separator on the positive depolarizing mix and fitting to the opening end of the positive can a negative electrode collector accommodating a negative electrode material mix and a large amount of an electrolyte therein with intervention of a gasket having an L-letter form section, followed by crimping the rim of the positive can inwardly so as to press the gasket to the negative electrode collector. Thus, irrespective of a button type or a cylinder type, a gasket has a role not only of separating a positive electrode and a negative electrode from each other but also of keeping the inside of an alkaline cell liguid-tight. However, the leakage of an electrolyte in alkaline cells is frequently observed at a gasket part.

As the result of an extensive study to enhance the leak-proof property of an alkaline cell at the gasket part, it has found that a certain correlation is present between the moisture content of a gasket and the leak-proof property of an alkaline cell. Namely, a gasket having a lower moisture content has a higher elasticity and shows a higher sealing or packing effect. Thus, an alkaline cell incorporated with a gasket having a lowered moisture content shows a better leak-proof property. The present invention is based on the above finding.

According to the present invention, there is provided a leak-proof alkaline cell comprising a positive can and a negative electrode collector kept at the opening end of the postive can with intervention of a gasket so as to make the inside of the cell liquid-tight, characterized in that the gasket is made of an elastic material and has a moisture content of not more than 0.3% by weight.

As the material for preparation of a gasket in this invention, there is used an alkali-resistant, elastic material, preferably having a saturated moisture content of not less than 0.1% by weight. Specific examples of such material are polyacetals, ABS resins (acrylonitrile-butadiene-styrene copolymers), polyamides (e.g. Nylon 6, Nylon 66, Nylon 610, Nylon 11, Nylon 12), synthetic rubbers (e.g. butyl rubber, silicone rubber, ethylene-propylene rubber, chloroprene rubber), etc. Polyethylene, which is one of the most popular materials for preparation of a gasket, has a saturated moisture content of less than 0.1% by weight and is not suitable in this invention. Among the said suitable materials, preferred are polyamides. Particularly, the use of Nylon 11 (poly-condensation product of 11-aminoundecanoic acid; molecular weight, 10,000 to 40,000; saturated moisture content, 2.5%; "RILSAN BMNO" manufactured by ATO Chimie) is recommended.

The preparation of a gasket by the use of the said suitable materials may be carried out by a conventional procedure such as injection molding or punch molding. Characteristically, the moisture content of the gasket is lowered to 0.3% by weight or less prior to its assembly into an alkaline cell. In usual, the gasket as prepared above absorbs a considerable amount of moisture so as to show, for instance, a moisture content of several %, when allowed to cool in atmosphere after the molding. Such gasket may be dried, for instance, under a reduced pressure of about 10 mmHg for a period of 4 to 20 hours to make a moisture content of not more than 0.3% by weight. Elevation of the temperature is usually recommendable for shortening the drying time. However, such excessive heating as causing deformation to the gasket should be avoided. In general, heating at a temperature not exceeding 90° C. is favorable. When desired, the drying may be effected in the presence of a drying agent in a closed system connected or not to a pressure reducing system. Alternatively, the gasket immediately after the molding and having a low moisture content (frequently nearly 0) may be allowed to cool under the condition of low humidity and kept as such avoiding moisture.

In order to enhance the liquid-tight property at the contact face between the surface of the gasket and the negative electrode collector and also at the contact face between the surface of the gasket and the positive can, a sealing material is often applied to such contact faces. The use of the gasket according to this invention does not interfere with the application of such conventional liquid-tight procedure. Rather, the application of a sealing material is recommended since it is effective in enhancing the leak-proof property.

As the sealing material, there may be used a liquid material or a solution of a solid material in a suitable solvent. Specific examples of the sealing material are polyamides (e.g. Nylon 6, Nylon 66, Nylon 610, Nylon 11, Nylon 12), polyethylene, polypropylene, styrene resins, fluororesins, rubbery materials, pitch, fatty polyamides, rubbery adhesives (e.g. chloroprene rubber, nitrile rubber, silicone rubber butyl rubber), silicone oils, etc. Among them, preferred are pitch, fatty polyamides, rubber adhesives and silicone oils.

The sealing material may be applied to either one or both of the surface of the gasket and the surface(s) of the negative electrode collector and/or the positive can, normally at room temperature. Usually, the application is made to both surfaces. In case of the application being made to the surface(s) of the negative electrode collector and/or the postive can, it should be effected at least at the part(s) which are brought into contact with the gasket. When the sealing material is applied to the surface of the gasket, the decrease of the moisture content of the gasket to 0.3% by weight or less may be effected prior to the application, but preferably after the application.

For enhancing the leak-proof property more, the gasket applied the sealing material thereon may be fitted to the negative electrode collector applied the sealing material thereto to make an integral body. This integral body may be, after decreasing the moisture content of the gasket to 0.3% by weight or less by an appropriate procedure such as drying while heating (below 90° C.), incorporated with the positive can so as to assemble an alkaline cell.

In the present specification, the term "moisture content" is intended to mean the one measured by the following procedure: the total weight (Wa) of 10 to 20 gaskets sampled at random is weighed; those gaskets are dried at 45° C. in vacuum (10 mmHg or less) for 20 hours and cooled to 20° C., and then the resulting weight (Wb) is measured; and calculation is made according to the following formula:

$$\text{Moisture content (\%)} = \frac{Wa - Wb}{Wb} \times 100$$

The assembly of an alkaline cell provided with the gasket according to this invention may be carried out by a per se conventional procedure.

Figure 2:
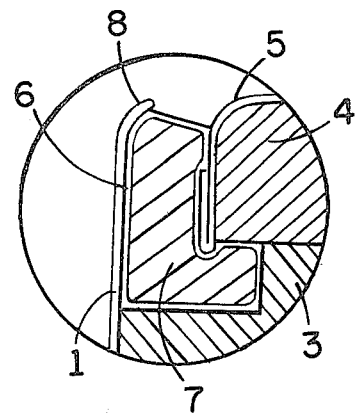

Illustrating a typical example of the assembly with reference to the accompanying drawing, FIG. 1 is a cross-section of a button type alkaline cell, and FIG. 2 is a partial enlarged cross-section of the part A in FIG. 1.

At the bottom of a positive can 1, a positive depolarizing mix 2 comprising a positive active material (e.g. $Ag_2O$, $HgO$, $MnO_2$) and an electroconductive material (e.g. graphite) and a small amount of an alkaline electrolyte (e.g. aqueous KOH) are admitted. On the positive depolarizing mix 2, a separator layer 3 comprising a protective film (e.g. polypropylene film), a separator sheet (e.g. cellophane sheet) and an electrolyte retaining sheet (e.g. non-woven fabric sheet) is placed. At the opening end of the positive can 1, a negative electrode collector 5 accommodating a negative electrode material mix 4 comprising zinc powder and a large amount of an alkaline electrolyte is fitted with an intervention of a gasket 7 having an L-letter form section. The rim 8 of the positive can 1 is inwardly crimped so as to press the gasket 7 to the negative electrode collector 5, whereby the inside of the thus assembled alkaline cell is made liquid-tight. The said gasket 7 is made of an alkali-resistant, elastic material having a saturated moisture content of not less than 0.1% by weight and has a moisture content of not more than 0.3% by weight. At the surface of the gasket 7, there is provided a sealing material layer 6 so as to enhance the sealing or packing effect.

Practical and presently preferred embodiments of this invention are illustratively shown in the following Examples wherein % and part(s) are by weight unless otherwise indicated.

EXAMPLE 1

Nylon 610 having a saturated moisture content of 0.1% or higher was injection molded to make a gasket having an L-letter form section. The gasket was kept at 30° C. under 10 mmHg for 20 days, and then a 10% pitch solution in toluene was applied to the surface of the gasket to make a coating film of 200 to 300 microns in thickness. The moisture content of the gasket immediately before assembly into a dry cell was 0.02%. By the use of this gasket, a button type alkaline dry cell was assembled according to a conventional manner.

EXAMPLE 2

In the same manner as in Example 1 but using a gasket kept at 20° C. under a relative humidity of 65% for 3 hours and having a moisture content of 0.1%, a button type alkaline dry cell was assembled.

EXAMPLE 3

In the same manner as in Example 1 but using a gasket kept at 20° C. under a relative humidity of 65% for 8 hours and having a moisture content of 0.3%, a button type alkaline dry cell was assembled.

COMPARATIVE EXAMPLE 1

In the same manner as in Example 1 but using a gasket kept at 20° C. under a relative humidity of 65% for 20 hours and having a moisture content of 0.5%, a button type alkaline dry cell was assembled.

COMPARATIVE EXAMPLE 2

In the same manner as in Example 1 but using a gasket kept at 20° C. under a relative humidity of 90% for 25 hours and having a moisture content of 1.0%, a button type alkaline dry cell was assembled.

Each of the dry cell as prepared in Examples 1 to 3 and Comparative Examples 1 and 2 was cleaned at the surface and allowed to stand at 45° C. under a relative humidity of 90% for 50 days, 100 days or 150 days. Thereafter, an indicator prepared by dissolving cresol red (0.1 part) in a mixture of water (80 parts) and ethanol (20 parts) was dropped at the gasket part on the outer surface of the dry cell for detection of the leakage of the electrolyte; the presence of leakage gave the color change to red.

The results are shown in Table 1 wherein the numeral indicates the number of the dry cells having leakage in the tested 100 dry cells.

Table 1

| Example | Number of dry cells having leakage | | |
|---|---|---|---|
| | After 50 days | After 100 days | After 150 days |
| 1 | 1 | 12 | 35 |
| 2 | 2 | 15 | 43 |
| 3 | 3 | 21 | 60 |
| Comparative | | | |
| 1 | 5 | 42 | 90 |
| 2 | 12 | 70 | 100 |

From the above results, it is understood that a button type alkaline dry cell assembled by the use of a gasket having a moisture content of not more than 0.3% shows a good leak-proof property.

EXAMPLE 4

Nylon 11 having a saturated moisture content of 2.5% was injection molded to make a gasket having an L-letter form section. The gasket was kept at 30° C. under 10 mmHg for 20 days, and then a 10% pitch solution in toluene was applied to the surface of the gasket to make a coating film of 200 to 300 microns in thickness. The moisture content of the gasket immediately before assembly into a dry cell was 0.02%. By the use of this gasket, a button type alkaline dry cell was assembled according to a conventional manner.

EXAMPLE 5

In the same manner as in Example 4 but using a gasket kept at 20° C. under a relative humidity of 65% for 3.5 hours and having a moisture content of 0.1%, a button type alkaline dry cell was assembled.

EXAMPLE 6

In the same manner as in Example 4 but using a gasket kept at 20° C. under a relative humidity of 65% for 7 hours and having a moisture content of 0.3%, a button type alkaline dry cell was assembled.

COMPARATIVE EXAMPLE 3

In the same manner as in Example 4 but using a gasket kept at 20° C. under a relative humidity of 65% for 22 hours and having a moisture content of 0.5%, a button type alkaline dry cell was assembled.

COMPARATIVE EXAMPLE 4

In the same manner as in Example 4 but using a gasket kept at 20° C. under a relative humidity of 90% for 30 hours and having a moisture content of 1.0%, a button type alkaline dry cell was assembled.

Each of the dry cells as prepared in Examples 4 to 6 and Comparative Examples 3 and 4 was cleaned at the surface and allowed to stand at 45° C. under a relative humidity of 90% for 50 days, 100 days or 150 days. Then, an indicator prepared by dissolving cresol red (0.1 part) in a mixture of water (80 parts) and ethanol (20 parts) was dropped on the outer surface at the gasket part for detection of leakage.

The results are shown in Table 2 wherein the numeral indicates the number of the dry cells having leakage in the tested 100 dry cells.

Table 2

| Example | Number of dry cells having leakage | | |
|---|---|---|---|
| | After 50 days | After 100 days | After 150 days |
| 4 | 1 | 10 | 30 |
| 5 | 1 | 12 | 35 |
| 6 | 2 | 18 | 50 |
| Comparative | | | |
| 3 | 3 | 30 | 80 |
| 4 | 10 | 60 | 100 |

From the above results, it is understood that a button type alkaline dry cell assembled by the use of a gasket made of Nylon 11 and having a moisture content of not more than 0.3% shows an excellent leak-proof property.

EXAMPLE 7

Nylon 11 was injection molded to make a gasket having an L-letter form section. The gasket was kept at 20° C. under a relative humidity of 65% for 25 hours, whereby the moisture content was raised from 0% (immediately after the molding) to 0.9%. Onto the surface of the gasket, a 10% pitch solution in toluene was applied to make a coating film of 200 to 300 microns in thickness. The resulting gasket was dried at 90° C. under 10 mmHg for 4 hours to make a moisture content of 0%, and then it was assembled into a button type alkaline dry cell according to a conventional manner.

EXAMPLE 8

In the same manner as in Example 7 but using a gasket dried at 90° C. under 10 mmHg for 15 minutes after application of the pitch solution to make a moisture content of 0.3%, a button type alkaline dry cell was assembled.

Each of the dry cells as prepared in Examples 7 and 8 was cleaned at the surface and allowed to stand at 45° C. under a relative humidity of 90% for 50 days, 100 days or 150 days. Then, an indicator prepared by dissolving cresol red (0.1 part) in a mixture of water (80 parts) and ethanol (20 parts) was dropped on the outer surface at the gasket part for detection of leakage.

The results are shown in Table 3 wherein the numeral indicates the number of the dry cells having leakage in the tested 100 dry cells.

Table 3

| Example | Number of dry cells having leakage | | |
|---|---|---|---|
| | After 50 days | After 100 days | After 150 days |
| 7 | 1 | 9 | 38 |
| 8 | 1 | 15 | 42 |

From the comparison of the results in Table 3 with the results (Examples 4 and 6) in Table 2, it is understood that the drying treatment of a gasket after application of the pitch solution and before assembly into the dry cell so as to decrease the moisture content is effective in enhancing the leak-proof property.

EXAMPLE 9

Nylon 11 was injection molded to make a gasket having an L-letter form section. The gasket was kept at 20° C. under a relative humidity of 65% for 25 hours, whereby the moisture content was raised from 0% (immediately after the molding) to 0.9%. Onto the surface of the gasket, a 10% pitch solution in toluene was applied to make a coating film of 200 to 300 microns in thickness. Separately, a negative can was applied with the pitch solution at the surface, which is to be brought into contact with the gasket, so as to make a coating film of 200 to 300 microns in thickness. Then, the gasket was fitted to the negative can and dried at 90° C. under 10 mmHg for 4 hours to decrease the moisture content of the gasket to 0%. The resultant integral body was assembled into a button type alkaline dry cell.

EXAMPLE 10

In the same manner as in Example 9 but using an integral body of the gasket and the negative can fitted therewith dried at 90° C. under 10 mmHg for 15 minutes to make a moisture content of 0.3%, a button type alkaline dry cell was assembled.

Each of the dry cells as prepared in Examples 9 and 10 was cleaned at the surface and allowed to stand at 45° C. under a relative humidity of 90% for 50 days, 100 days or 150 days. Then, an indicator prepared by dissolving cresol red (0.1 part) in a mixture of water (80 parts) and ethanol (20 parts) was dropped on the outer surface at the gasket part for detection of leakage.

The results are shown in Table 4 wherein the numeral indicates the number of the dry cells having leakage in the tested 100 dry cells.

Table 4

| Example | Number of dry cells having leakage | | |
|---|---|---|---|
| | After 50 days | After 100 days | After 150 days |
| 9 | 0 | 2 | 10 |
| 10 | 1 | 12 | 35 |

From the comparison of the results in Table 4 with the results (Examples 4 and 6) in Table 2 and the results in Table 3, it is understood that the integration of the gasket and the negative can fitted therewith with intervention of the pitch solution, followed by drying to decrease the moisture content of the gasket is effective in enhancing the leak-proof property.

What is claimed is:

1. A leak-proof alkaline cell comprising a positive can and a negative electrode collector provided at the opening end of the positive can with intervention of a gasket so as to make the inside of the cell liquid-tight, characterized in that the gasket is made of a polyamide resin and has a moisture content of not more than 0.3% by weight.

2. The cell according to claim 1, wherein the polyamide resin is the polycondensation product of 11-aminoundecanoic acid.

3. The cell according to claim 1 or 2, wherein the gasket is provided with a coating layer of a sealing material at the surface.

4. The cell according to claim 3, wherein the sealing material is a member selected from the group consisting of pitch, fatty polyamides, rubbery adhesives and silicone oils.

5. A leak-proof alkaline cell comprising a positive can and a negative electrode collector provided at the opening end of the positive can with intervention of a polyamide resin gasket so as to make the inside of the cell liquid-tight, characterized in that the gasket has a moisture content of not more than 0.3% by weight on the assembly of the gasket into the cell.

6. The cell according to claim 5, wherein the gasket is provided with a coating layer of a sealing material at the surface.

7. The cell according to claim 6, wherein the positive can and the negative electrode collector are provided with a coating layer of a sealing material at the surface(s) which are brought into contact with the gasket.

* * * * *